United States Patent [19]

Okamura et al.

[11] Patent Number: 4,679,109

[45] Date of Patent: Jul. 7, 1987

[54] TAPE CASSETTE DRIVEN RIB DEVICE

[75] Inventors: Masatoshi Okamura, Saku; Haruo Shiba, Komoro, both of Japan

[73] Assignee: TDK Corporation, Tokyo, Japan

[21] Appl. No.: 765,586

[22] Filed: Aug. 14, 1985

[30] Foreign Application Priority Data

Aug. 23, 1984 [JP] Japan .......................... 59-127812[U]

[51] Int. Cl.[4] ........................ G11B 15/32; G11B 23/04
[52] U.S. Cl. .................................... 360/132; 360/963; 242/200
[58] Field of Search ............................ 360/132, 96.3; 242/197–201, 205

[56] References Cited

U.S. PATENT DOCUMENTS

| | | | |
|---|---|---|---|
| 3,865,331 | 2/1975 | Clever et al. | 242/199 |
| 4,210,296 | 7/1980 | Frechette | 242/198 |
| 4,436,256 | 3/1984 | Saitou | 242/200 |
| 4,473,198 | 9/1984 | Pertzsch et al. | 242/199 X |

Primary Examiner—John H. Wolff
Attorney, Agent, or Firm—Seidel, Gonda, Goldhammer & Abbott

[57] ABSTRACT

A tape cassette includes a pair of reels for a magnetic tape. Each reel has a center opening. A plurality of first ribs extends radially into the opening from a peripheral wall of the opening. A recorder deck has a pair of parallel drive spindles. Each drive spindle is for insertion into one opening of the pair of reels. Each drive spindle has a second rib. The second rib is adapted for engagement with the first rib. The first rib includes an end face having a planar surface on a trailing side of the first rib. The trailing side is defined with respect to a tape-slack removing, rotational direction. The planar surface is inclined in such a manner that insertion of the spindles into the openings, the second rib engages the first rib, and creates a force which drives the reel in the tape-slack removing rotational direction.

3 Claims, 9 Drawing Figures

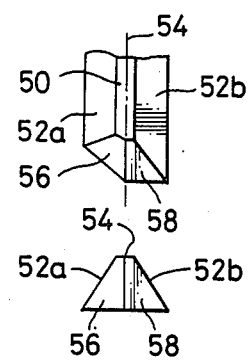
Fig. 1A
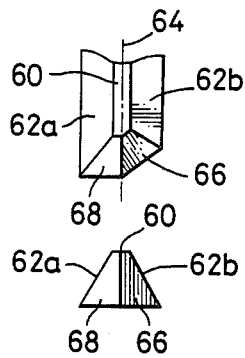
Fig. 1B
Fig.1D    Fig.1C
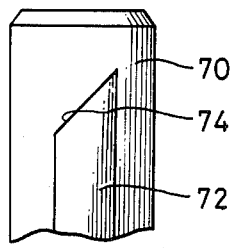
Fig. 5A
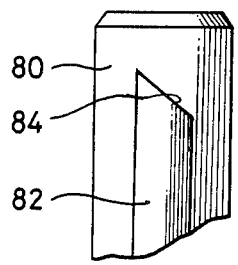
Fig. 5B
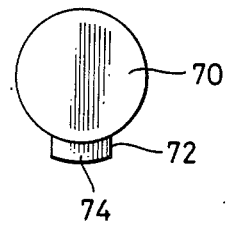
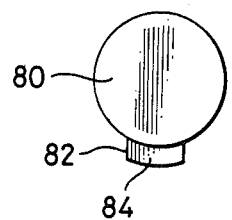
Fig.5D    Fig.5C

Fig. 3A PRIOR ART
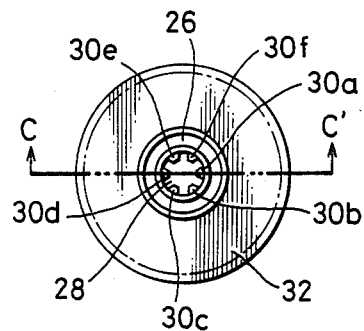
Fig. 3B PRIOR ART
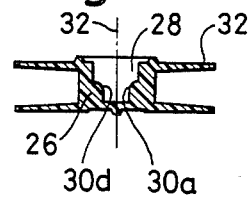
Fig. 4B PRIOR ART
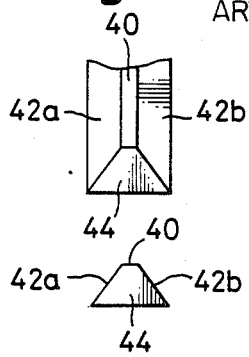
Fig. 4A PRIOR ART
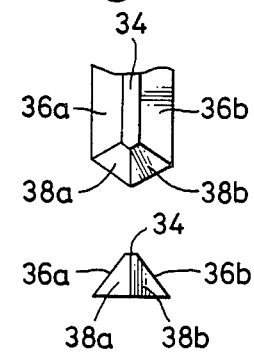
Fig. 4D PRIOR ART
Fig. 4C PRIOR ART

TAPE CASSETTE DRIVEN RIB DEVICE

BACKGROUND OF THE INVENTION

This invention relates to a cassette for video, audio, or other tape, in which the tape is unwound from a feed reel and wound on a takeup reel, and more particularly to driven ribs projecting inwardly from the surrounding wall of the center hub opening of each such reel.

Conventionally, video and other tape cassettes are equipped with a front cover, known as a lid, at the front opening of the cassette housing. When the cassette is not in use, the lid closes the opening under the urging of a spring to protect the otherwise exposed tape portion with the front covering. This prevents intrusion of dust and dirt from the front into the opening, and also provides protection against fingerprinting due to careless handling, damaging, or oil staining. Without the protection, erroneous signals, disturbed video pictures in the case of a video tape, or dropout errors of audio tape could result. Even with the protection, however, the bottom of the front end of the cassette housing remains partly open, to be ready for tape loading or for other reasons. This condition lasts while the cassette is not in use. Accordingly, the ingress of dust from the bottom of the opening is not interrupted. Such a structure, if directly applied to the construction of video tape cassettes and the like, would cause serious errors because video signals are most susceptible to dust and dirt. With video cassettes, therefore, the dustproofness of the opening bottom has been an urgent problem to be settled. As an approach to the problem a mechanism has already been developed as illustrated by an exploded perspective view in FIG. 2. Numeral 10 designates an upper half housing part, 12 a lower half housing part, and 14 a front lid. They are assembled together to provide an enclosed space in which a feed reel 16 and takeup reel 18 are held in place. 20 is a length of magnetic tape, which is unwound during recording or playback from the feed reel 16 to be wound on the takeup reel 18. The passageway for the magnetic tape 20 extends from openings formed in the vicinities of the right end walls of the upper and lower half housing parts 10, 11 to openings in the vicinities of the left end walls of the same parts, through the space at the front of the front openings of these parts. A conventionally provided lid is a front lid 14, which covers the front side of the magnetic tape 20. 24 is an inner lid newly associated with the front lid 14. It covers the back side of the magnetic tape to provide protection against the ingress of dust and dirt into the housing from the front bottom thereof. A tape cassette of this character is, of course, equipped with reel brakes (not shown), or means for keeping stoppers at work to prevent unwinding of the tape due to unintentional turning of reels while the cassette is not in use as when being transported and for taking off the brakes when the cassette is used.

FIG. 3 shows one of the tape cassette reels in detail, as a bottom view (A) and a sectional view (B) taken along the line C—C' of (A). In these views, 26 is a reel hub which serves as a core of the magnetic tape. 28 is a center opening of the hub 26. Along the circumference of the center opening 28, there are equidistantly provided a plurality of, say six, inwardly projecting driven ribs 30 (i.e., 30a, 30b, 30c, 30d, 30e, and 30f) of the same contour, e.g., of an elongate, truncated pyramidal shape. When the cassette is set on a deck, drive spindles (not shown) drivably engage the ribs to transmit driving forces to the ribs. The longitudinal directions of the driven ribs 3 are closely in parallel with the centerline 32 of the center opening 28 of the particular hub. Reel flanges, indicated at 32, keep the magnetic tape properly on the hubs.

FIG. 4 shows two types of the driven ribs in fragmentary enlarged views of their end portions. The two types are characterized by their configurations shown in sets of upper and lower views (A and C) and (B and D). In each set, the upper view is of the driven rib as seen from the inside of the center opening of the hub, and the lower view is of the rib as seen from below its bottom. In the set of views (A and C), 34 is an upper face, 36 (36a, 36b) is a set of inclined side faces, left and right, and 38 (38a, 38b) is a set of inclined end faces, left and right, dividing the lower end portion into two equal planes. In the set of views (B and D), 40 is an upper face, 42 (42a, 42b) is a set of inclined side faces, left and right, and 44 is an end bevel. The mere end bevel 44 and the inclined end faces 38 differ in the angle of inclination to the surrounding wall of the hub opening. The inclined faces have a greater inclination angle each than the end face that has resulted from mere beveling.

When such a tape cassette is set on a deck, the reel brakes are released, allowing the feed and takeup reels to revolve freely. In the center hub opening 28, formed with the driven ribs 30, of each reel is fitted one of the reel drive spindles (not shown) of the deck. At this point, the lid turns through an angle of 90 deg. under the urging of a spring to expose part of the magnetic tape at the front opening of the cassette housing. At the time of setting, in the manner described, the reel drive spindles drivingly engage the center hub openings 28 of the reels almost synchronously with the release of the reel brakes. The engagement brings drive ribs (not shown) projecting sidewise from the reel drive spindles into contact with the driven ribs 30 projecting inwardly from the center openings of the hubs. Here arises a problem from the fact that the ends of the driven ribs 30 engaged with the drive ribs are either mere bevels 44 or pairs of laterally symmetrically inclined faces 44 as described above and the driven ribs 30 resting on the drive ribs are slidable and movable in either direction. Nevertheless, the brakes are on the reel drive spindles of the deck. This sometimes causes the magnetic tape wound on the feed and/or takeup reel to loosen and slack at the front opening of the cassette housing. If the cassette with the slack tape is unloaded from the deck without being wound back, the lid in the closing motion can take a "bite" of the slack tape between itself and the upper and lower half parts of the housing. This tape "bite" problem is more serious with video tape cassettes that include the front lid 14, inner lid 24, and other components.

SUMMARY OF THE INVENTION

In view of the afore-described difficulties of the prior art, the present invention is aimed at providing a tape cassette in which the driven ribs of the tape reels are improved in the end configurations to eliminate the possibility of tape biting.

The object is realized, in accordance with the invention, by dividing the end portion of each driven rib into two faces and forming an inclined end face 56 or 66 as in FIG. 1. The feed and takeup reels differ in the location where the inclined end faces are formed, but the inclined faces are formed on opposite sides of the two-face end portions, so that the two freely-revolving reels are turned in the tape-winding or -slack removing directions. The inclined face of each reel is the face on the tape-unwinding side and inclined with respect to the surrounding wall of the center opening of the reel as well as to the horizontal plane so as to rotate slightly the reel when the rib engages with one of drive ribs of reel drive shaft in the slack-removing direction. To this end, it is desirable that the contacting faces of the drive ribs of reel drive spindles to contact the inclined end faces be inclided to a degree substantially the same as the angle of the inclined end faces 56 or 66.

BRIEF DESCRIPTION OF THE DRAWINGS

FIGS. 1 (A&B) shows essential parts of an embodiment of the present invention in fragmentary enlarged views of the end portions of driven ribs;

FIGS. 3 (A&B) shows details of one of the reels in FIG. 2;

FIGS. 4 (A&B) shows the end portions of the driven ribs of FIG. 3 by types in fragmentary enlarged views; and FIGS. 5 (A&B) shows the end portions of drive ribs adapted to contact the driven ribs in fragmentary enlarged views.

DETAILED DESCRIPTION OF THE INVENTION

Figure 2:
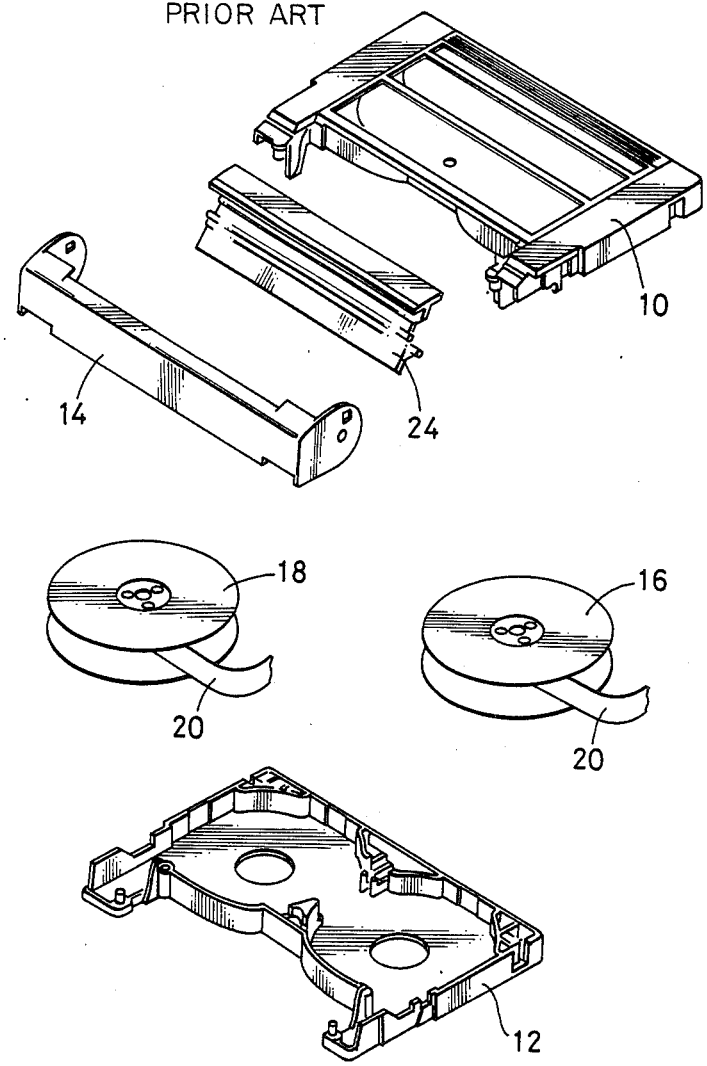
FIG. 2 is an exploded perspective view of a video tape cassette proposed by the prior art.

The means according to the invention function in the following manner.

Since the end portion of each driven rib is divided into two faces, one being inclined as at 56 or 66 in FIG. 1, it occurs whenever the driven rib end portion comes on top of a drive rib of the reel drive spindle, that the steeper-inclined end face 56 or 66 slides down first by its own weight from the drive rib. As a consequence, the driven rib is imparted with a force of turning from the inclined end face 56 or 66 toward the bevel end face 58 or 68. With the inclined and bevel end faces of the driven rib end portions of the feed and takeup reels arranged opposite to each other in the mirror-image fashion, the individual reels can turn in the tape-winding directions thereby keeping the magnetic tape taut at the front opening of the housing. With the face of the drive rib of each reel drive spindle to contact the inclined end face 56 or 66 of each driven rib inclined to the degree substantially equal to the inclination of the face 56 or 66, the contacting face 74 or 84 of the drive rib can fitly contact the inclined end face 56 or 66 of the driven rib, allowing the latter to slide smoothly down from the former and thereby add to the turning force of the reel in the tape-winding direction.

An embodiment of the invention will now be described with reference to the drawings.

FIG. 1 shows essential parts of the embodiment, or the end portions of driven ribs in fragmentary enlarged views. The configurations that characterize the invention are indicated in two sets of views, upper and lower, in (A and C) and (B and D). In each set, the upper view is of the driven rib as seen from the inside of the center opening of the hub, and the lower view is of the rib as seen from below its bottom. As compared with the conventional products, the embodiment being described is different only in the contour of the end portion of the driven rib. The other counterparts are the same, and therefore the explanation of the like parts is omitted here. Except for mention by way of the illustration of the essential parts of this embodiment, they are referred to in the description of the prior art.

In (A and C) where the end portion of a driven rib of the feed reel is shown, 50 is an upper face and 52 (52a, 52b), inclined side faces, left and right. 54 indicates a longitudinal centerline of the driven rib, by which the end face is divided into two, and inclined end face 56 and a bevel end face 58. In (B and D) which shows the end portion of a driven rib of the takeup reel, 60 is an upper face and 62 (62a, 62b), inclined side faces, left and right. 64 is the longitudinal centerline of the driven rib which divides the end face into two, an inclined end face 65 and a bevel end face 68.

Thus, the feed and takeup reels differ in the positions that the inclined end faces in the end portions of their driven ribs assume. The inclined end faces of the driven ribs of the feed reel are located on the left side and those of the takeup reel are located on the right. When the cassette is set on a deck with reel drive spindles of the deck fitted in the center hub openings of the cassette reels, each driven rib end portion that comes on the drive rib slides down gravitationally with the steply inclined end face 56 or 66 faster than the other face. Consequently, the driven rib is given a force of turning from the inclined end face 56 or 66 toward the bevel end face 58 or 68. Because the both reels are caused to turn in the tape-winding directions, they can tension the magnetic tape portion running through the front opening of the cassette housing.

FIG. 5 shows the end portions of drive ribs suitably adapted to engage the driven ribs of the embodiment being described in fragmentary enlarged views. Two sets of upper and lower views (A and C) and (B and D) indicate the characteristics of the end portions. In each set, the upper view is a side view of a fragment of a reel drive spindle showing the drive rib end portion, and the lower view is a plan view of the same fragment. In (A and C) where the drive rib end portion of the feed reel drive spindle is shown, 70 is the reel drive spindle, 72 is the drive rib, and 74 is a face to contact the inclined end face 56 of each driven rib of the feed reel. The drive rib contacting face 74 is inclined to substantially the same degree as the inclined end face of the driven rib. In (B and D) illustrating the drive rib end portion of the takeup reel drive spindle, 80 is the reel drive spindle, 82 is the drive rib, and 84 is a face to contact the inclined end face 66 of each driven rib of the takeup reel. The drive rib contacting face 74 too is of substantially the same inclination angle as the end face 66.

With the contacting face 74 or 84 of the drive rib of each reel drive spindle inclined to the degree substantially equal to that of the inclined end face 56 or 66 of the driven rib of each reel with which the face 74 or 84 comes in contact in the manner described, the contacting face 74 or 84 fitly engage the face 56 or 66, allowing the latter to slide down the former smoothly by gravity and add its quota of turning force.

On each reel drive spindle a plurality of drive ribs may be provided instead of one.

According to the present invention, as described above, the end face of each driven rib of each reel is divided into two, an inclined end face and a bevel. When the cassette is set on a deck, turning forces develop in the reel-winding directions to keep the magnetic tape from slackening and thereby preclude the possibility of a tape "bite" between the lid and other parts of the cassette.

What is claimed is:

1. A tape cassette including a pair of reels for a magnetic tape, each reel having a center opening, a plurality of first ribs extending radially into said opening from a peripheral wall of said opening, a pair of parallel drive spindles of a recorder deck, said drive spindle being adapted for insertion into one said opening, each drive spindle having a second rib, said second rib being adapted for engagement with said first rib, said first rib comprises an end face having a planar surface on a trailing side of said first rib, said trailing side being defined with respect to a tape-slacking removing rotational direction, said planar surface being inclined in such a manner that insertion of said spindles into said opening whereby said second rib engages said first rib, creates a force which drives said reel in said tape-slack removing rotational direction.

2. A tape cassette according to 1 wherein said drive spindle is provided with at least one second rib having an inclined upper face which is generally complementary to the inclined planar surface of first rib.

3. A tape cassette according to claim 1, wherein said end face of said first rib further comprises a second inclined surface, said second inclined surface being inclined only with respect to the surrounding wall of the center opening.

* * * * *